J. W. CRUIKSHANK.
GLASS CARRYING ROD FOR GLASS ANNEALING LEERS.
APPLICATION FILED APR. 18, 1917.
1,308,337.
Patented July 1, 1919.
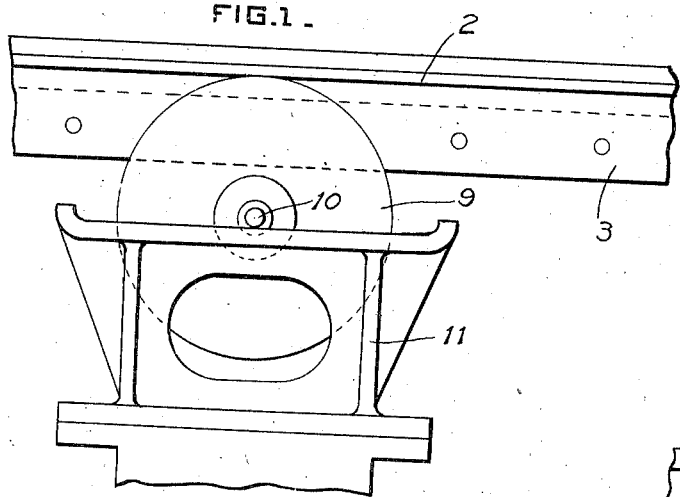
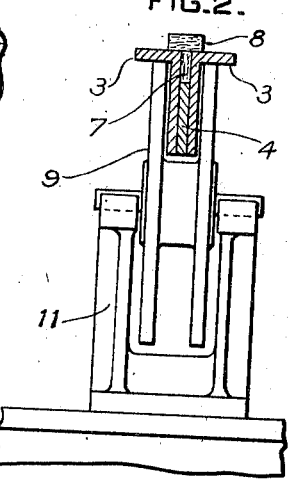
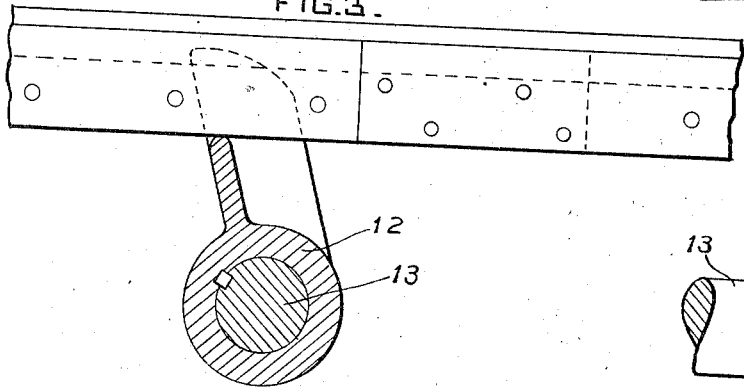
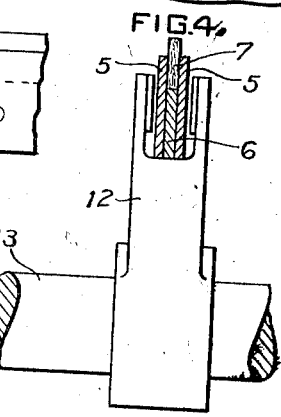
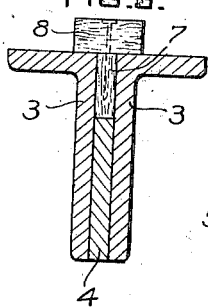
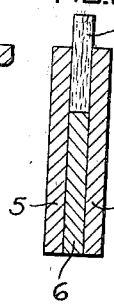
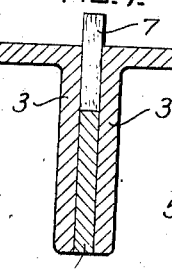
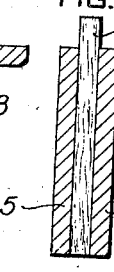
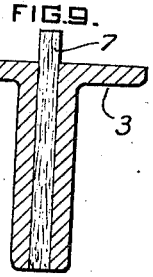
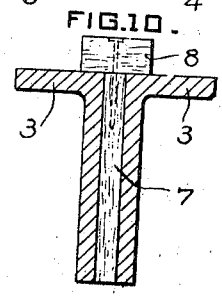
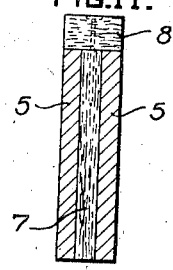
INVENTOR

UNITED STATES PATENT OFFICE.

JAMES W. CRUIKSHANK, OF PITTSBURGH, PENNSYLVANIA, ASSIGNOR TO J. W. CRUIKSHANK ENGINEERING COMPANY, OF PITTSBURGH, PENNSYLVANIA.

GLASS-CARRYING ROD FOR GLASS-ANNEALING LEERS.

1,308,337. Specification of Letters Patent. Patented July 1, 1919.

Application filed April 18, 1917. Serial No. 163,056.

*To all whom it may concern:*

Be it known that I, JAMES W. CRUIKSHANK, resident of Pittsburgh, county of Allegheny, State of Pennsylvania, have invented a new and useful Improvement in Glass-Carrying Rods for Glass-Annealing Leers, of which the following is a specification.

The object of this invention is to provide a carrying or lifting bar for glass sheets in an annealing leer partly of a substance that will have a low conductivity of heat. Heretofore the bars have been made of iron or steel which readily absorb heat from the sheet of glass in case of their being cooler than it, or transmit heat in case of their being of a higher temperature, with the result that vents or cracks are developed in the sheets which ultimately cause breakage. Various means have been attempted for covering the rods with a non-conducting material with varying degrees of success, one means being to use asbestos cloth fastened to the tops of the rods with silicate of soda cement. The heat and wear however soon cause the asbestos cloth to become loose and no satisfactory means has been found so far for covering the rods.

In order to overcome the bad results from cold rods against the comparatively warm glass it has been found necessary to provide heat in the flues under the leer so as to keep the rods warm, otherwise breakage occurs. The leerway is a cooling chamber and it is desirable that the temperature of the glass should be reduced as much as possible before leaving it. There is some difficulty in accomplishing this result as the radiation is proportionately much slower from the plate as it cools, the ratio of cooling varying with the cube of the differences of the temperature of the plate and the temperature of the outside air and surroundings. It is obvious therefore that when the sheet is reduced to a temperature of some 200 degrees the cooling is then very slow and the addition of heat so that the rods will be kept at such a temperature that they will not damage the glass is detrimental to its cooling.

The leer is fully described in my Patent No. 717,172 and is practically of the same construction as shown therein. In the accompanying drawings:

Figure 1 is a side view of the carrying bar and a detail of a supporting sheave.

Fig. 2 is a cross section of the bar and end view of the sheave.

Fig. 3 is a side elevation of the lifting bar with the lifting cam in cross section.

Fig. 4 is a cross section of the lifting bar with the cam and a portion of the shaft in elevation.

Figs. 5, 7, 9 and 10 are details of carrying bars in modified forms.

Figs. 6, 8 and 11 are forms of lifting bars.

Referring to the drawings the lifting bar designated by the numeral 2 is composed of two sections of angle iron 3, riveted together with a distance piece 4, between them. 5 are bars used in the lifting bars riveted together having between them the filling piece 6. 7 is a strip of material such as asbestos clamped between angles 3 or the side bars 5 which in one form projects above the surface of the iron and in the other form, as in Figs. 5 and 10, is used as a nailing strip to nail a strip of the same material 8 so as to give a larger carrying surface for the glass. 9 is a sheave wheel supported on trunnion shafts 10 supported on stand 11. 12 is a lifting cam of the usual form keyed on a shaft 13 which carries a series of these cams across the width of the leerway.

In practice I prefer the form shown at Figs. 5 and 11 as giving a larger surface for the glass to rest on, and this form is more advantageous as the asbestos, when it becomes worn is more easily renewable by replacing the tops without taking apart the entire bar. I do not limit myself to the bars as specified, but may use the section designated as a carrying bar in place of the lifting bar supported by the cams, and I do not limit myself to the exact form of the details as shown, and may make any modifications and variations which do not depart from the spirit of my invention.

I claim:

In a sheet glass annealing leer, a carrying rod having a glass supporting surface of a material of less conductivity than iron comprising in combination two steel sections having their web members or longest dimension in a vertical plane, a material such as asbestos bolted between them so as to form a nailing strip by which a strip of non-conducting material can be secured at the upper edge of the steel sections.

J. W. CRUIKSHANK.